United States Patent
Rabie et al.

(10) Patent No.: US 7,029,504 B2
(45) Date of Patent: Apr. 18, 2006

(54) METHOD FOR PRODUCING CALCIUM NITRATE GRANULES

(75) Inventors: Dirk Renier Hendrik Rabie, Vanderbijipark (ZA); Wilfred Roy Morris, Sasolburg (ZA); Johannes Petrus Gysbert Eygelaar, Vanderbijipark (ZA)

(73) Assignee: Omnia Fertilizer Limited, (ZA)

( * ) Notice: Subject to any disclaimer, the term of this patent is extended or adjusted under 35 U.S.C. 154(b) by 396 days.

(21) Appl. No.: 10/275,062

(22) PCT Filed: May 2, 2001

(86) PCT No.: PCT/IB01/00732

§ 371 (c)(1),
(2), (4) Date: Feb. 3, 2003

(87) PCT Pub. No.: WO01/83374

PCT Pub. Date: Nov. 8, 2001

(65) Prior Publication Data

US 2004/0098840 A1 May 27, 2004

(30) Foreign Application Priority Data

May 3, 2000 (ZA) .................................. 2000/2150

(51) Int. Cl.
*C01B 21/48* (2006.01)

(52) U.S. Cl. .................................. 23/313 FB; 423/397
(58) Field of Classification Search ................ 423/395, 423/397; 23/313 FB
See application file for complete search history.

(56) References Cited

U.S. PATENT DOCUMENTS 3,001,228 A * 9/1961 Herman .......................... 264/7
3,255,036 A * 6/1966 Kramer et al. .............. 427/213

(Continued)

FOREIGN PATENT DOCUMENTS

FR       764 440 A       5/1934

(Continued)

OTHER PUBLICATIONS

Database CA Online, Chemical Abstracts Service, Gladushko et al, "Evaporation of Solutions and Granulation of Calcium Nitrage in a Fluidized Bed," Database assession No. 66:96971, XP002186899, pp. 226-231 (1966), no month.

(Continued)

*Primary Examiner*—Wayne A. Langel
(74) *Attorney, Agent, or Firm*—Birch, Stewart, Kolasch & Birch LLP

(57) ABSTRACT

This invention relates to a method for producing calcium nitrate granules. A calcium nitrate melt is sprayed into a re-circulating bed of a first fluidized bed granulator, wherein the re-circulating bed is supplied with air that has been conditioned and heated to a temperature of between 60° C. and 100° C. Calcium nitrate granulates formed in the granulator are introduced to a primary cooler in the form of a second fluidized bed where the granules are cooled to from 50° C. to 60° C. by conditioned air. The granules are sorted in a sorter and then cooled in a secondary cooler to a temperature of less than 40° C. before being bagged. The granules so produced are hard and dry and do not break down easily during handling.

14 Claims, 1 Drawing Sheet

U.S. PATENT DOCUMENTS

| | | | |
|---|---|---|---|
| 4,353,709 A | * | 10/1982 | Nioh et al. .............. 23/313 FB |
| 4,353,730 A | * | 10/1982 | Kinno et al. .................... 71/29 |
| 5,213,820 A | * | 5/1993 | Uhlemann et al. .......... 425/222 |
| 5,326,432 A | | 7/1994 | Evans |
| 5,779,945 A | * | 7/1998 | Nijsten et al. .................. 264/7 |

FOREIGN PATENT DOCUMENTS

| | | |
|---|---|---|
| GB | 249 370 A | 3/1926 |
| GB | 380 007 A | 9/1932 |
| GB | 510 053 A | 7/1939 |
| WO | WO 0/02831 * | 1/2000 |

OTHER PUBLICATIONS

Glatt Firmenschrift: "Anlage fur das kontinuierliche Granulieren und Trocknen," XP002186898 (1992), no month.

"Granulate in fluid bed", pp. 203-208—*Hydrocarbon Processing,* Sep. 1991.

* cited by examiner

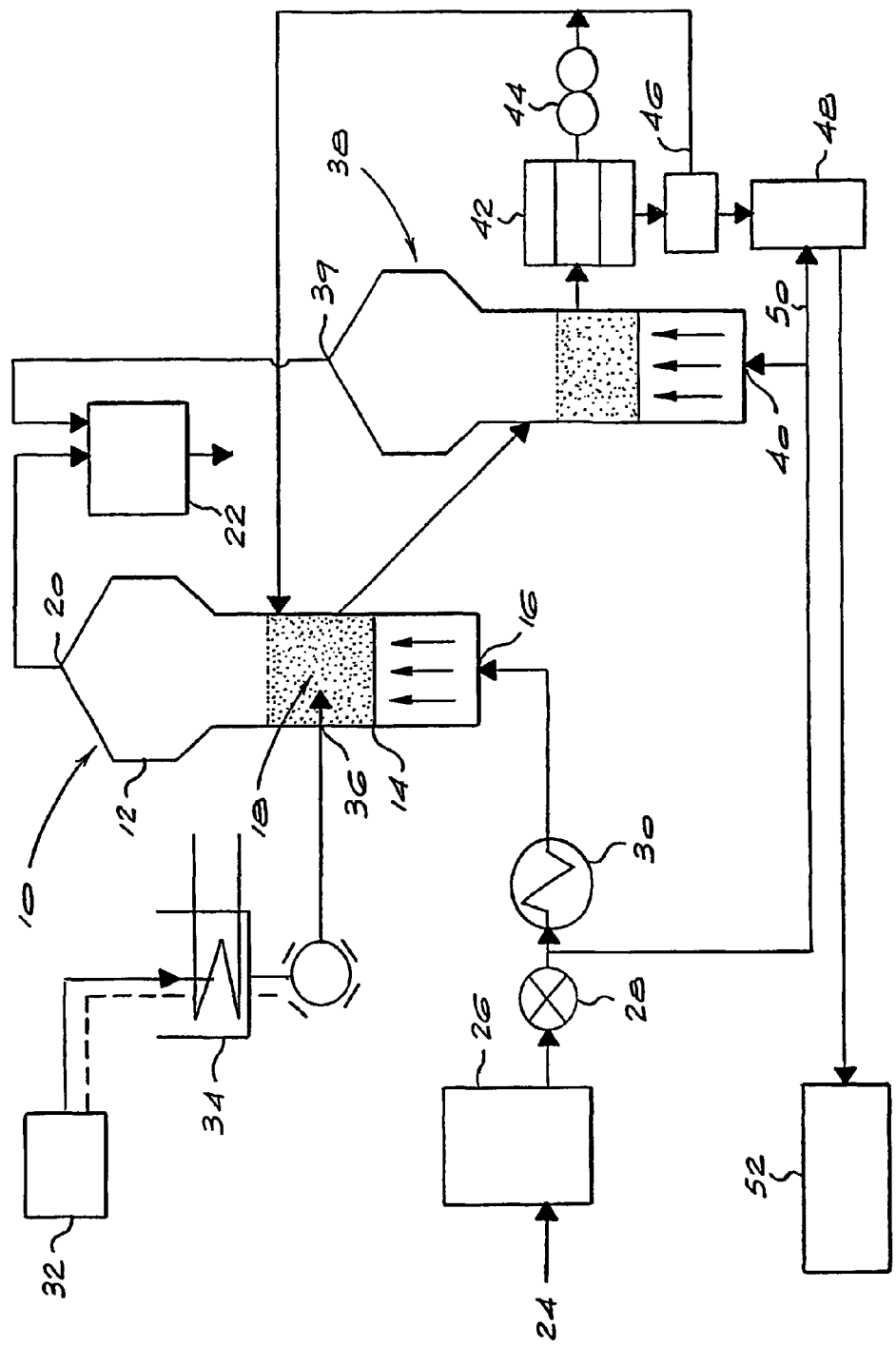

METHOD FOR PRODUCING CALCIUM NITRATE GRANULES

This application is the national phase under 35 U.S.C. § 371 of PCT International Application No. PCT/IB01/00732 which has an International filing date of May 2, 2001, which designated the United States of America.

BACKGROUND OF THE INVENTION

THIS invention relates to a method for producing calcium nitrate granules.

Several processes for producing solid calcium nitrate are known, these processes include granulation in a drum or pan granulator, prilling or flaking. Calcium nitrate granules are used mainly in agriculture as a fertilizer and as a raw material for explosives.

It is an object of this invention to provide an improved method for producing calcium nitrate granules.

SUMMARY OF THE INVENTION

In broad terms, this invention relates to the production of calcium nitrate granules from liquid calcium nitrate using a fluidised bed granulation technique.

According to the invention there is provided a process for producing calcium nitrate granules, the process including the steps of:
  preparing a calcium nitrate melt;
  spraying the melt into a recirculating bed of a first fluidised bed granulator, wherein the recirculating bed is supplied with air that has been conditioned; and
  collecting calcium nitrate granules formed in the granulator.

The conditioned air preferably has a relative humidity of less than 30% at 40° C.

Advantageously, the conditioned air is heated to a temperature of between 60° C. and 100° C., preferably between 80° C. and 100° C.

The calcium nitrate granules collected from the granulator are preferably introduced to a primary cooler in the form of a second fluidised bed where the granules are cooled to from 50° C. to 60° C. by conditioned air, before being sorted in a sorter.

After being sorted, the granules are typically cooled in a secondary cooler in the form of a third fluidised bed to a temperature of less than 40° C., by conditioned air at a temperature of less than 35° C., before being bagged.

BRIEF DESCRIPTION OF THE DRAWING

The drawing shows a schematic process line for a process according to an embodiment of the invention.

DETAILED DESCRIPTION OF AN EMBODIMENT OF THE INVENTION

Referring to the drawing, a fluidised bed granulator 10 is used to produce calcium nitrate granules from liquid calcium nitrate. The fluidised bed granulator 10 consists of a stainless steel cabinet 12 which is divided by a horizontally oriented perforated plate 14. A stream of air 16 is pumped into the bottom of the granulator 10, through the perforated plate 14, into a fluidised bed region 18 and extracted at a top exit 20 of the granulator 10 whereafter it is passed through a scrubber 22 and released to the atmosphere.

In this process, ambient air 24 is drawn into a radiator-type condenser 26 containing water which is chilled from 6° C. to 15° C., by way of a fan 28. The air drawn into the condenser 26 is cooled to below the dew point thereof, water vapour condenses and the air is thus cooled and conditioned. By "conditioned" is meant that moisture has been removed from the air. The conditioned air preferably has a relative humidity of less than 30% at 40° C. The conditioned air is then passed through a steam-heated radiator 30 which heats the air to a temperature of from 60° C. to 100° C. The conditioned, heated, air 16 is then pumped into the granular 10, to form the fluidized bed 18.

A liquid calcium nitrate solution 32 is produced by reacting a calcium source, for example calcium carbonate with nitric acid. In this embodiment of the invention a 60% nitric acid solution is neutralised with lime stone ($CaCO_3$). A slight excess of nitric acid is used to convert all of the lime. Undissolved impurities are then removed by filtration and excess nitric acid in the solution is neutralised with ammonia. The filtered solution thus contains an amount of ammonium nitrate. Conditions are operated to give a typical mole ratio of 5 moles calcium nitrate and 1 mole ammonium nitrate in solution.

The liquid calcium nitrate 32, which has a concentration of 70%–80% (m/m), is passed to a concentration unit 34 and is concentrated to 85%–90% (m/m), with a 10%–15% free moisture content, using steam at 8–10 bar (0.8–1 MPA) pressure. The concentrated calcium nitrate liquid is then injected into the fluidised bed zone 18 of the granulator 10 via spray nozzles 36 at a temperature of 130° C. to 140° C.

When the fluidised bed granulator is started up, it is provided with calcium nitrate seeding particles which have a size of approximately 1 to 5 mm. The concentrated calcium nitrate liquid is sprayed into the fluidised bed zone 18 of the fluidised bed granulator 10, and the remaining 10%–15% free moisture in the calcium nitrate is removed by the hot conditioned air 16. The liquid calcium nitrate is deposited onto the calcium nitrate seeding particles, to form granules of calcium nitrate. The granules of calcium nitrate are very hygroscopic. The conditioned air 16, which has a relative humidity of less than 30% at 40° C. is very important. If the air 16 was not conditioned, the granules may absorb moisture from the air, become sticky, and agglomerate.

Granules of calcium nitrate formed within the fluidised bed granulator 10 are passed into a second, adjacent fluidised bed which is a primary cooler 38. The primary cooler 38 cools the granules down to about 50° C. to 60° C., with conditioned air 40 from the condenser radiator 26 which has been heated to a temperature of 30° C. to 40° C. If the granules were not passed through the primary cooler 38 for cooling, a heat imbalance would result. Also, the granules would become too hot, resulting in melting or softening of the granules. The primary cooler 38 also makes it possible to increase the production capacity of the fluidised bed granulator 10, as the flow rate of hot melt at 130° C. into the fluidised bed granulator 10 can be increased. Air from the fluidised bed 38 is extracted from a top exit 39 thereof and passed through the scrubber 22 whereafter it is released to the atmosphere.

The granules are then passed from the primary cooler 38 to a sorter in the form of a double-deck screen 42, where they are sorted. The screen size will depend on the size of the granules required. The screen 42 will usually have holes with diameters from 2 mm to 5 mm. Over-sized granules are fed to a crusher 44 and recycled to the fluidised bed granulator 10, as seeding particles. Fines 46, i.e. those granules of less than 2 mm in diameter are also returned to the fluidised bed granulator 10, as seeding particles.

The "on-size" granules are then passed to a secondary cooler 48 in the form of a third fluidised bed where they are cooled to below 40° C. with conditioned air 50 from the condenser 26, whereafter the final product is bagged 52.

The granules produced by the process are hard and dry and do not break down easily during handling. The granules also have a lower caking tendency, are easily soluble in water and have a uniform particle size distribution.

The final product may, if it is desired, be treated with an anti-caking agent such as oil-amine to decrease agglomeration of granules. This anticking agent would however not be suitable for granules that are intended for a water-soluble fertilizer. A water-soluble anti-caking agent, such as naphtalene sulphonate, may be used if a water-soluble product is required.

EXAMPLE

A first liquid calcium nitrate solution was produced in a continuous process by neutralising nitric acid with calcium carbonate. 8.5 tons/hour of a 60% nitric acid solution was neutralised with 4.1 tons/hour calcium carbonate. A slight excess of nitric acid was used. The solution was then passed through a filter leaf press to remove insoluble matter and was then neutralised with 0.12 tons/hour ammonia to form ammonium nitrate in the solution. The mole ratio of calcium nitrate to ammonium nitrate in the solution was 5:1. The first solution had the following composition:

| | |
|---|---|
| Calcium: | 14.7% (m/m) |
| Nitrogen in ammoniacal form: | 1.0% (m/m) |
| Nitrogen in nitrate form: | 11.3% (m/m) |

The first solution mentioned above was then concentrated at atmospheric pressure by evaporating water from the solution using steam at a pressure of 8 bar (0.8 MPA) through steam coils in a concentrator tank, to form a second, concentrated, solution The second solution had a water content of 13.2% (excluding water of crystallisation) and a composition of:

| | |
|---|---|
| Calcium: | 16.4% (m/m) |
| Nitrogen in ammoniacal form: | 1.2% (m/m) |
| Nitrogen in nitrate form: | 12.8% (m/m) |

The second solution reaches a temperature of 139° C. during the evaporation step.

The second solution was then pumped into the fluidized bed granulator through four air atomizing nozzles at a rate of 2.15 tons/hour. The fluidised bed granulator was supplied with heated conditioned air. The conditioned air, which had been passed through a radiator-type condenser, had a relative humidity of 28% at 40° C., and was heated to a temperature of 92° C. The fluidised bed granulator had a total fluidising surface of 1.00 m² with 8% apertures of 1.5 mm diameter holes.

The calcium nitrate granules from the fluidised bed granulator were then passed to a primary cooler in the form of a second fluidised bed with a total fluidising surface of 0.65 m² and the same apertures as the first fluidised bed. The second fluidised bed was supplied with heated conditioned air from the radiator-type condenser. The conditioned air had a relative humidity of 28% at 40° C., and was heated to a temperature of 35° C.

Granules from the primary cooler, which had a temperature of 57° C. and which had a particle size from <0.5 mm to 12 mm, were then screened through a double deck Sweco™ screen on a product size of from between 2 mm to 5 mm which were then fed through a secondary cooler with a total fluidising surface of 0.60 m² and the same aperture site as the other fluidised beds at a rate of 1.9 tons/hour. The secondary cooler was provided with conditioned air having a moisture content of 28% at 40° C. which had been heated to 32° C. The final product exiting from the secondary cooler was at a temperature of 39° C. The final product was bagged directly into 1 ton bags and transported to a bagging unit where it was bagged into 25 kg bags.

The final product composition was:

| | |
|---|---|
| Calcium: | 18.9% (m/m) |
| Nitrogen in ammoniacal form: | 1.45% (m/m) |
| Nitrogen in nitrate form: | 14.7% (m/m) |

1 ton=1×10³ kg

The invention claimed is:

1. A process for producing calcium nitrate granules, the process including the steps of:
   preparing a calcium nitrate melt having a free moisture content of 10%–15%;
   vial spraying the melt into a re-circulating bed of a first fluidized bed granulator, wherein the re-circulating bed is supplied with air that has been conditioned to a relative humidity of less than 30% at 40° C. and heated to a temperature between 60° C. and 100° C. to form calcium nitrate granules; and
   cooling the calcium nitrate granules in a second fluidized bed to a temperature of from 50° C. to 60° C. and recycling a portion of the cooled granules to the first fluidized bed granulator, as seeding particles.

2. The process according to claim 1, wherein the conditioned air in the first fluidized bed is heated to a temperature of between 80° C. and 100° C.

3. The process according to claim 1, wherein the air introduced to the second fluidized bed is conditioned and has a relative humidity of less than 30% at 40° C.

4. The process according to claim 3, wherein the conditioned air introduced to the second fluidized bed is heated to a temperature of between 30° C. and 40° C.

5. The process according to claim 4, wherein the granules collected from the second fluidized bed, after being sorted, are introduced to a third fluidized bed and cooled to below 40° C., by conditioned air, before being bagged.

6. The process according to claim 5, wherein the conditioned air introduced to the third fluidized bed has a relative humidity of less than 30% at 40° C.

7. The process according to claim 6, wherein the conditioned air introduced to the third fluidized bed has a temperature of less than 35° C.

8. The process according to claim 1, wherein the calcium nitrate melt sprayed into the first fluidized bed granulator has a concentration of 85% to 90% (m/m), and a temperature of 130° C. to 140° C.

9. The process according to claim 2, wherein the calcium nitrate melt sprayed into the first fluidized bed granulator has a concentration of 85% to 90% (m/m), and a temperature of 130° C. to 140° C.

10. The process according to claim 3, wherein the calcium nitrate melt sprayed into the first fluidized bed granulator has a concentration of 85% to 90% (m/m), and a temperature of 130° C. to 140° C.

11. The process according to claim 4, wherein the calcium nitrate melt sprayed into the first fluidized bed granulator has a concentration of 85% to 90% (m/m), and a temperature of 130° C. to 140° C.

12. The process according to claim 5, wherein the calcium nitrate melt sprayed into the first fluidized bed granulator has a concentration of 85% to 90% (m/m), and a temperature of 130° C. to 140° C.

13. The process according to claim 6, wherein the calcium nitrate melt sprayed into the first fluidized bed granulator has a concentration of 85% to 90% (m/m), and a temperature of 130° C. to 140° C.

14. The process according to claim 7, wherein the calcium nitrate melt sprayed into the first fluidized bed granulator has a concentration of 85% to 90% (m/m), and a temperature of 130° C. to 140° C.

* * * * *